United States Patent [19]

Koch

[11] Patent Number: 5,205,625
[45] Date of Patent: Apr. 27, 1993

[54] MULTI-MEDIA FILE

[75] Inventor: Richard C. Koch, Trabuco Canyon, Calif.

[73] Assignee: Fellowes Manufacturing Company, Itasca, Ill.

[21] Appl. No.: 736,719

[22] Filed: Jul. 26, 1991

[51] Int. Cl.⁵ .................. A47B 81/06; B65D 85/57
[52] U.S. Cl. .................. 312/9.54; 312/9.55; 312/193; 312/348
[58] Field of Search ............... 312/9.54, 10, 12, 15, 312/350, 9.55, 348.3, 193; 208/444, 387; 211/41, 184

[56] References Cited

U.S. PATENT DOCUMENTS

| | | |
|---|---|---|
| D. 160,015 | 9/1950 | Rauch et al. . |
| 2,238,451 | 4/1941 | Roth . |
| 2,281,845 | 5/1942 | Kaplan . |
| 2,297,081 | 9/1942 | Slough . |
| 2,304,007 | 12/1942 | Mendelson . |
| 2,346,705 | 4/1944 | Sabin . |
| 3,807,572 | 4/1974 | Luvara et al. ............ 211/184 X |
| 4,126,229 | 11/1978 | Sheres . |
| 4,128,175 | 12/1978 | Schweizer . |
| 4,396,123 | 8/1983 | Swan . |
| 4,453,785 | 6/1984 | Smith ....................... 312/10 |
| 4,511,194 | 4/1985 | Park et al. . |
| 4,600,110 | 7/1986 | Timor . |
| 4,629,067 | 12/1986 | Pavlik et al. . |
| 4,684,027 | 8/1987 | Wright . |
| 4,712,679 | 12/1987 | Lowe . |
| 4,743,156 | 5/1988 | Raffay et al. . |
| 4,779,730 | 10/1988 | Hartsfield et al. . |
| 4,875,743 | 10/1989 | Gelardi et al. . |
| 4,889,244 | 12/1989 | Hehn et al. . |
| 4,949,853 | 8/1990 | Klein et al. ............ 211/184 X |
| 4,966,278 | 10/1990 | Rosi et al. . |

OTHER PUBLICATIONS

1991 Office Products Catalog from City Office Supply Corp., Copyrighted 1990, pp. 467–478.
May–Jun. 1991 MISCO® Catalog, center tear-out page.
Visible Supply Computer Supply Corporation catalog, p. 45, 1991 Promotional Bulletin, Innovative Concepts, 1991.

Primary Examiner—Peter R. Brown
Attorney, Agent, or Firm—Willian Brinks Olds Hofer Gilson & Lione

[57] ABSTRACT

A multi-media storage tray is provided that can store and organize different combinations of media. The tray has a removable center insert that allows 3½ inch computer diskettes to be placed side by side.

22 Claims, 6 Drawing Sheets

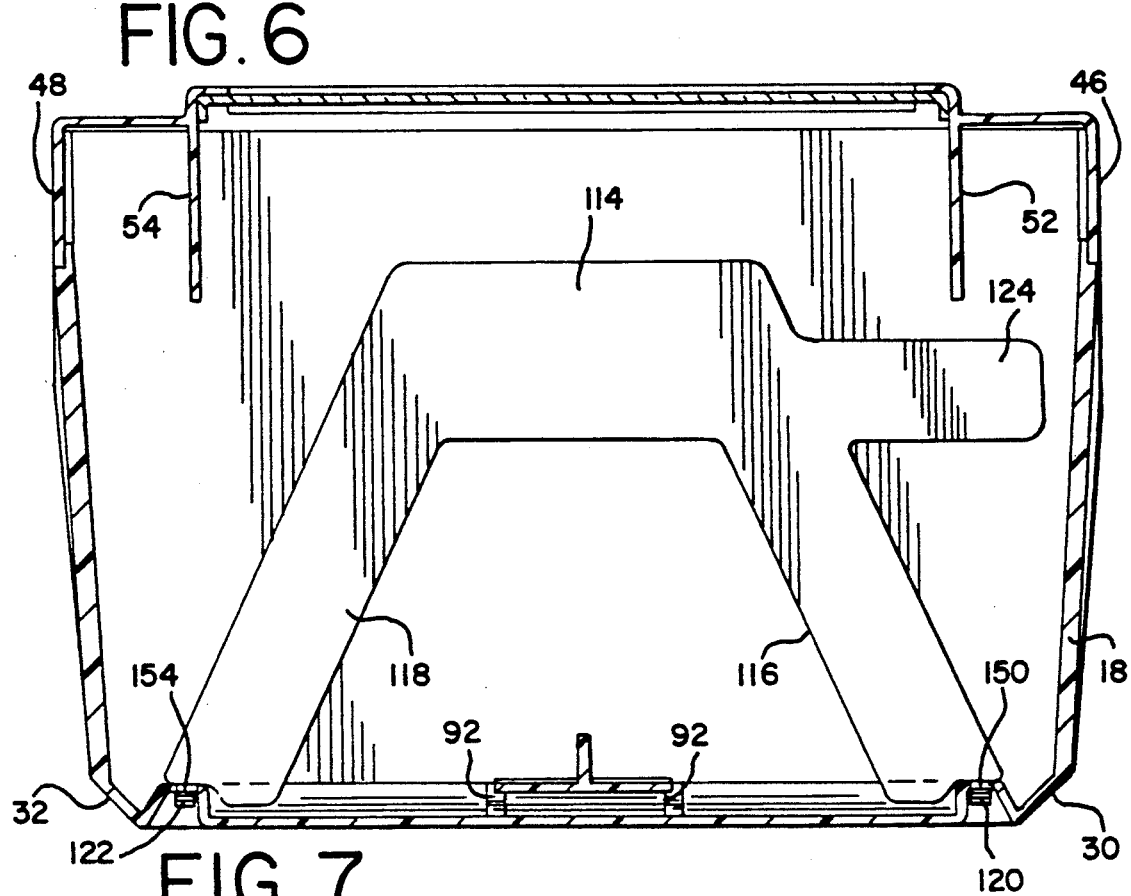
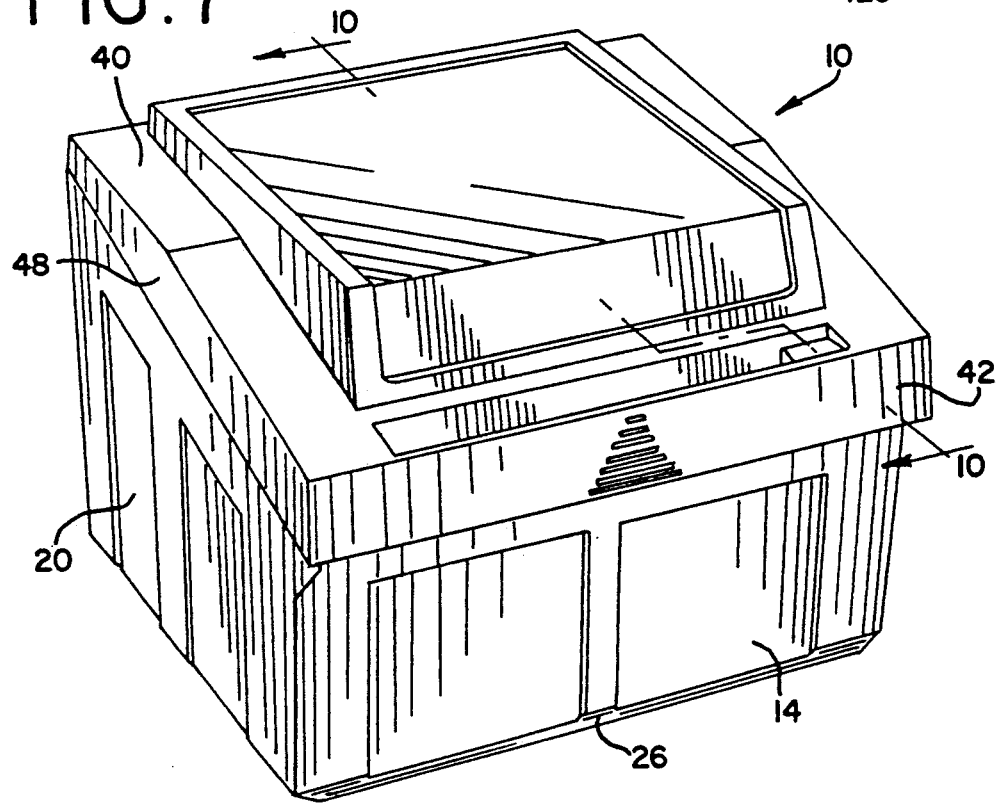

MULTI-MEDIA FILE

BACKGROUND OF THE INVENTION

The present invention relates to a multimedia tray or container useful for storing and organizing different types of media, preferably, media for use with computers. At the present, there exists several types of commonly used media for use in personal computers. One is commonly known as the 5¼ inch diskette or a "floppy disk." Another is a mini data cartridge. Yet another is a CD-ROM optical disk or compact disk which is stored in a container that is slighty wider and thicker than a floppy disk. Finally, another type is a 3½ inch type diskette. The designation of each diskette relates to its width.

In the past, the prevalence of computers that required the use of 5¼ inch diskettes resulted in a proliferation of trays or containers useful for storing and organizing those types of diskettes. However, with the recent advent of computers that use media other than the 5¼ inch diskette, there is a need for a container that will store these types of media. Moreover, many computer users now have more than one disk drive for their computer so that they are able to use any combination of the above-described media. Accordingly, there is a need for a multi-media container that will store and organize all or any combination of these different types of media in a single container. The multi-media tray of the present invention solves this need.

SUMMARY OF THE INVENTION

The multi-media tray of the present invention has a bottom with four walls extending upward from the bottom. On the inside of the bottom, there is provided a first plurality of spaced apart ridges that extend upward from the bottom along one side wall of the tray. The ridges define a first plurality of grooves. Also on the bottom is a second plurality of spaced apart ridges that are parallel and opposed to the first plurality of ridges and extend upward from the bottom along the other side wall of the tray. These ridges define a second plurality of grooves which correspond to the first plurality of grooves. There is also provided a substantially flat removable center insert having a partition member extending upward from and longitudinally along the approximate centerline of the insert. The insert further has a plurality of transverse spaced apart ridges that define a plurality of insert grooves such that when the insert is placed into the inside of the bottom, the insert grooves correspond to each of the first and the second plurality of grooves.

Preferably, each of the bottom, walls, the first and second plurality of ridges are made of plastic and are integrally molded. In addition, the removable center insert is preferably made of plastic.

In another embodiment, the multi-media tray further has a top with a front wall, a rear wall and two parallel side walls, each extending downward from the top with the rear wall of the top being hinged to the bottom rear wall. The top can also have a first extension and a second extension where the first extension is spaced apart from and substantially parallel to one side wall and extends downward from the top such that it is substantially aligned with the side of the first plurality of ridges facing the center of the tray (the distal side) and where the second extension is spaced apart from and substantially parallel to the other side wall and extends downward from the top such that it is substantially aligned with the side of the second plurality of ridges facing the center of the tray (the distal side). The extensions extend downward an amount so as to substantially secure from lateral movement floppy disks or compact disk containers placed into the tray.

In another embodiment, there are provided a first plurality of slots located in the first plurality of grooves and a second plurality of slots located in the second plurality of grooves that correspond in location with the first plurality of slots. In addition, a plurality of dividers are provided, each having a first leg and a second leg whereby the first leg fits into a first slot and the second leg fits into a corresponding second slot. The dividers are located in any number of corresponding slots where the user desires to organize any number of floppy disks, 3½ inch disks, compact disk containers or any combination therof.

Of course it is to be understood that the multi-media tray of the invention can be used to store and organize any number and type of media and their respective cases, or containers, but for ease of reference the specification and appended claims will refer to 3½ inch disks and 5¼ inch disks or floppy disks.

BRIEF DESCRIPTION OF THE DRAWINGS

FIG. 6 is a cross-sectional view of several embodiments of the multi-media tray of the present invention taken along the front of the tray.

FIG. 7 is a perspective view of several embodiments of the multi-media tray of the present invention shown in a closed position.

DETAILED DESCRIPTION OF THE INVENTION AND PREFERRED EMBODIMENTS

Figure 1:
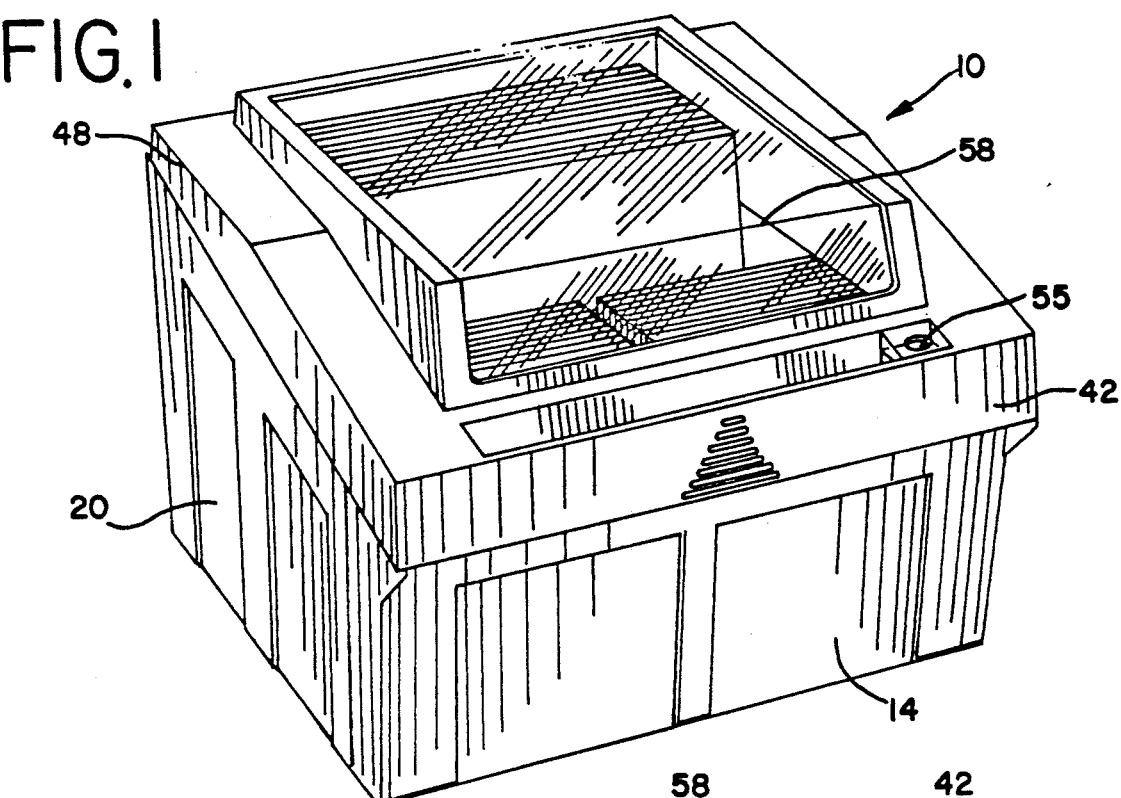
FIG. 1 is a front perspective view of several embodiments of the multi-media tray of the invention shown in a closed position with 5¼ inch type diskettes and 3½ inch type diskettes located therein.

FIG. 1 illustrates one embodiment of a multi-media tray 10 in a closed condition having a bottom 12 (not seen) with a bottom front wall 14, a bottom rear wall 16 (not seen) opposite the front wall 14, a first bottom side wall 18 (not seen), and a second bottom side wall 20 opposite the first side wall 18. Preferably, the tray 10 is molded from plastic. More preferably the tray 10 is integrally molded as one piece from plastic.

In another embodiment, the tray 10 has a top 40 with a top front wall 42, a top rear wall 44 (not seen), a first top side wall 46 (not seen) and a second top side wall 48 opposite side wall 46. The top rear wall 44 is connected to the bottom rear wall 16 by a hinge 50 best seen in FIG. 10. Preferably, the hinge 50 is made from plastic so that the entire tray 10, including the top 40 and the bottom 12 can be integrally molded from plastic. More preferably, the hinge 50 is a plastic living hinge.

In one embodiment, shown in FIG. 1, the top 40 has a snap-in plastic transparent window 58 so that when the tray 10 is in a closed condition, the contents of the tray can be seen.

Figure 2:
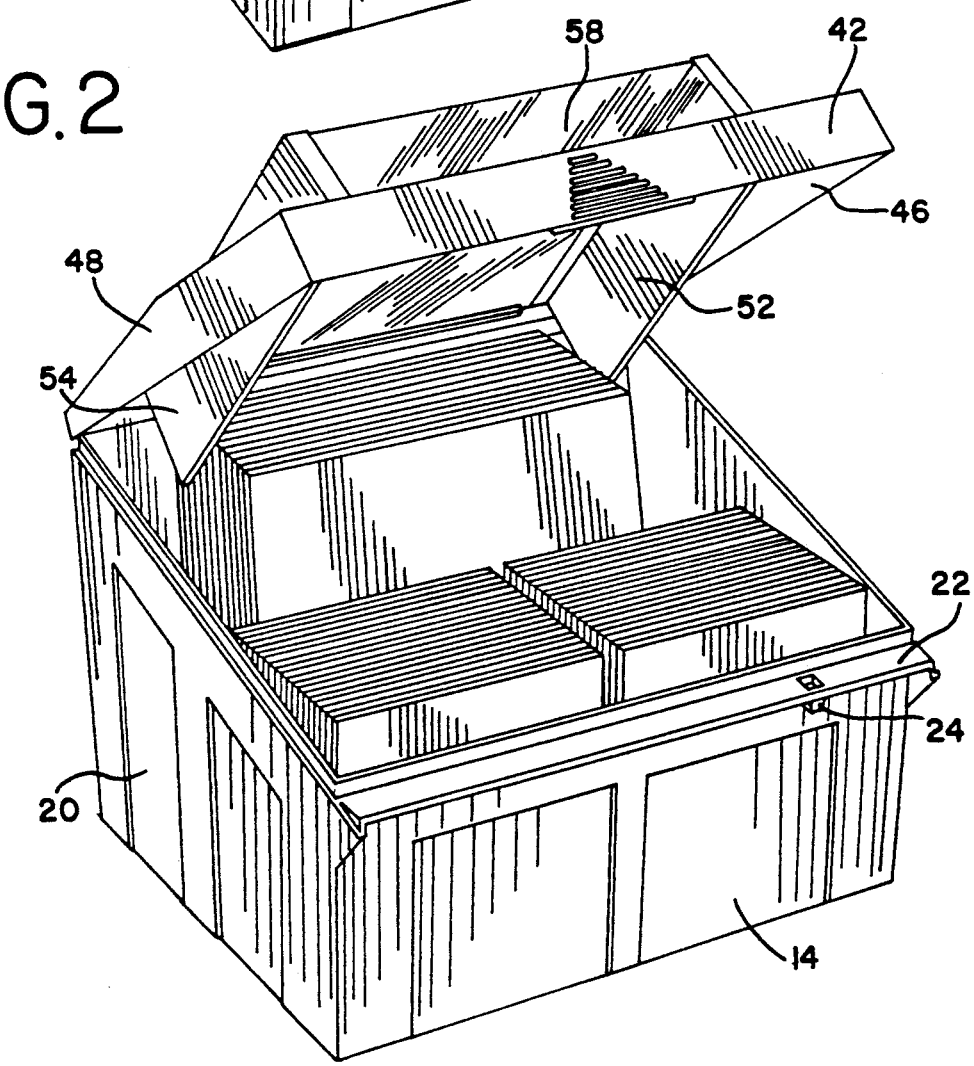
FIG. 2 is a front perspective view of several embodiments of the multi-media tray of the present invention shown in an open position with 5¼ inch type diskettes and 3½ inch type diskettes located therein.

As best seen in FIG. 2, the length of the bottom front wall 14 and the rear wall 16 is substantially the same and is preferably long enough to accommodate two 3½ inch disks placed side-by-side. Of course, if a top is provided, the length of the top front wall 42 and the top rear wall 44 will be substantially the same as the length of the bottom front wall 14 and the bottom rear wall 16. The length of the first and the second bottom side walls 18, 20 is substantially the same and may be any suitable length according to manufacturing or consumer preferences.

Figure 3:
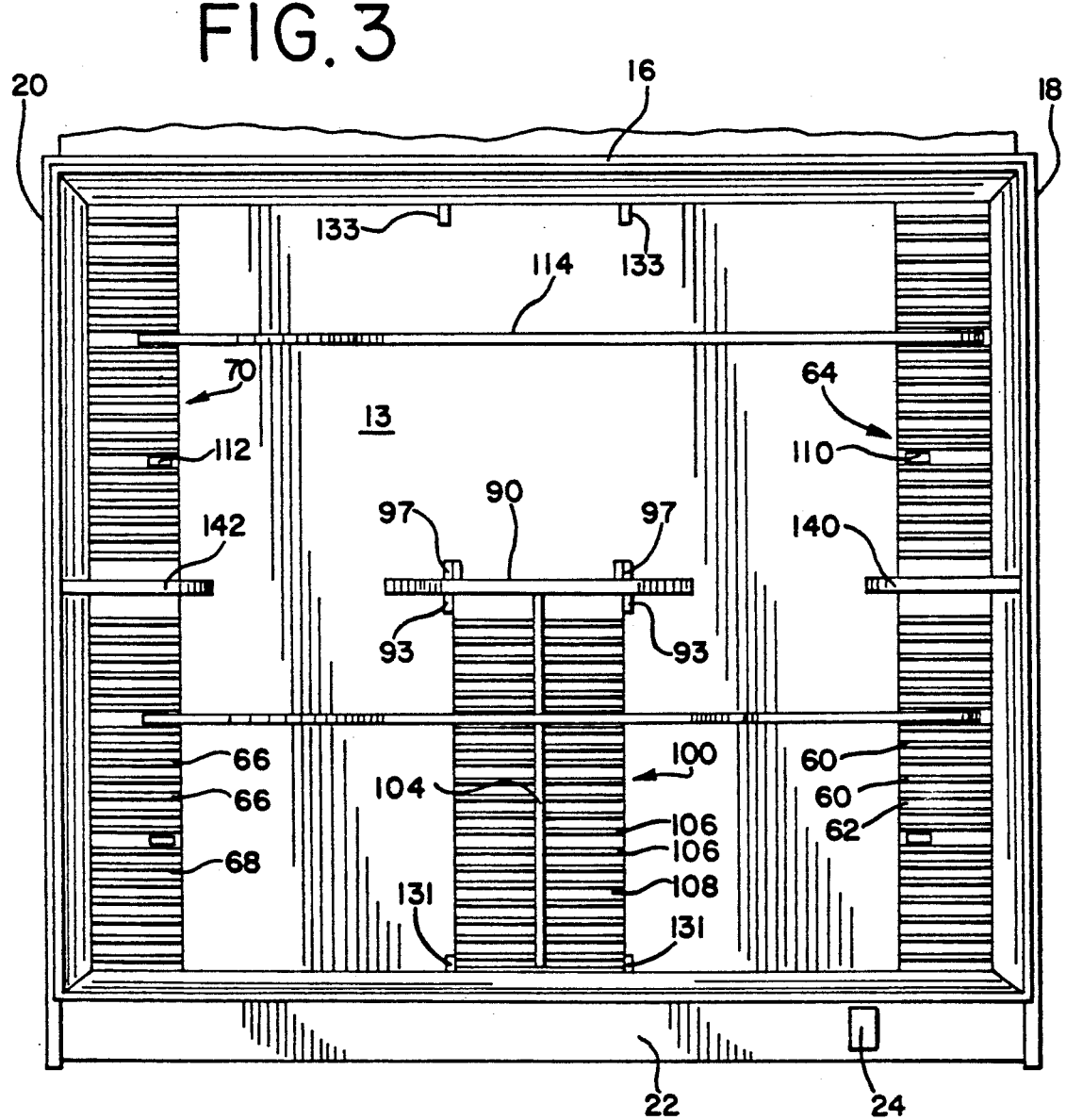
FIG. 3 is a top view of the several embodiments of the multi-media tray of the present invention.

As shown in FIG. 3, the inside of the bottom 13 has a first plurality of spaced apart ridges 60 located adjacent the first bottom side wall 18 to define a first plurality of grooves 62. The inside portion of the bottom 13 also has a second plurality of spaced apart ridges 66 adjacent to the second bottom side wall 20 to define a second plurality of grooves 68 which correspond in location with the grooves 62.

Each of the ridges 60 and 66 may have any suitable length and could, if desired, form a substantially continuous ridge that extends from the first side wall 18 to the second side wall 20. Preferably, each ridge 60 and 66 extend from their respective side wall 18 and 20 an equal amount. More preferably, the ridges 60 and 66 extend from their respective side wall 18 and 20 an amount such that the distal end 64 of the first ridges and the distal end 70 of the second ridges substantially position floppy disks placed in the bottom of the tray.

Each of the ridges 60 and 66 may have any suitable height to position and substantially secure 3½ inch disks, as will be explained below.

A substantially flat removable center insert 100 is provided and can be placed in the inside of the bottom 13 parallel to the side walls 18 and 20. Preferably, the center insert 100 is placed substantially along a center line between side walls 18 and 20, i.e., equidistant from side wall 18 and 20.

The center insert 100 has a partition member 104 that extends upward and longitudinally along the approximate center line of the insert 100. A plurality of transverse spaced apart ridges 106 on the center insert 100 define a plurality of insert grooves 108. The ridges 106 are located on the upper side of the insert 100, i.e., on the same side of the insert 100 as the partition member 104. Of course, the ridges 106 can have any suitable height.

When the center insert 100 is placed in the inside of the bottom 13 the insert grooves 108 correspond in location with the first grooves 62 and the second grooves 68. Preferably, the inside of the bottom 13 has a detent in the location where the center insert 100 is to be placed so that when the center insert 100 is placed into the tray, the insert grooves 108 will correspond in height with the first grooves 62 and the second grooves 68.

Accordingly, when the insert 100 is placed in the inside of the bottom 13 a number of 3½ inch disks can be placed in corresponding first grooves 60 and insert grooves 108 in the space defined by the bottom side wall 18 and the partition member 104. The 3½ inch disks will be positioned and substantially secured by corresponding ridges 60 and 106. As described above, each of the ridges 60 and 106 may have any suitable height according to manufacturing or consumer preferences.

The number of such diskettes that can be stored will be determined by the length of the center insert 100 which can be any suitable length, up to, of course, the length of the side walls 18, 20. In addition, a number of 3½ inch disks can be placed in corresponding second grooves 68 and insert grooves 108 in the space defined by the bottom side wall 20 and the partition member 104. These disks will be positioned and substantially secured by corresponding ridges 66 and 106.

In addition to storing and organizing 3½ inch disks, the tray 10 can also store and organize floppy disks as well as mini data cartridges, compact disk containers, CD-ROM optical disk containers (hereinafter referred to CDs) and the like. When it is desired to store both 3½ inch disks and floppy disks, the center insert 100 preferably has a length less than the entire length of the bottom side walls 18 and 20. When the length of the insert 100 is less than the entire length of the bottom walls 18 and 20, more than one center insert 100 can be used. In this case, each insert 100 has an identical shape except for, perhaps, the length of each. Conveniently, the length of the insert 100 is about one-half the length of the walls 18 and 20. In this case each insert 100 would be identical.

If a single insert 100, that has a length less than the entire length of the side wall 18 and 20, will be used it can be placed, for example, in the front half of the inside of the bottom 13. Then, 3½ inch disks can be placed in the front of the tray while floppy disks can be placed in the rear of the tray, as best seen in FIG. 2.

As described above, the first ridges 60 and the second ridges 66 extend from bottom walls 18 and 20, respectively, an amount to substantially position floppy disks placed in the inside of the bottom 13. Thus, the distal end of the first plurality of ridges 64 and the distal end of the second plurality of ridges 70 are substantially equally located from their respective bottom side walls 18 and 20 and are spaced apart an amount substantially equal to the width of a CD container. Thus, 3½ inch disks, floppy disks, and CD containers, as well as other types of media, can be stored and organized in the same container.

Where, however, the user desires to store only 3½ inch disks, the center inserts 100 may be placed back to back so that they extend from the front wall 14 to the rear wall 16. Moreover, if the user desires to store only floppy disks or other media, the center inserts 100 may be removed so that the floppy disks can be placed on the inside of the bottom 13.

Where more than one center insert 100 is to be used, a first means for securing 93 may be provided. For example, if the center insert 100 is about one-half the length of the side wall 18 then the securing means 93 would be located at about the center of the inside of the bottom 13. The means 93 may be a shoulder, ledge, lip, rim, or the like so that when the center insert 100 is placed in the bottom 12 the center insert 100 is secured from lateral movement. Preferably, the securing means 93 is formed onto the inside of the bottom 13 and extends upward.

In addition, front spaced apart nubs 131 may be provided. The nubs 131 extend inwardly from the bottom front wall 14 and are aligned with the securing means 93 to secure the center insert 100 from lateral movement.

A second means for securing 97 can also be provided and will be located adjacent the first securing means 93. The securing means 97 can be the same or different than the securing means 93. Preferably, the securing means 97 is formed onto the inside portion of the bottom and extends upward. Also, rear spaced apart nubs 133 are provided that extend inwardly from the bottom rear wall 16 and are aligned with the second securing means 97 to secure the center insert from lateral movement.

Figure 4:
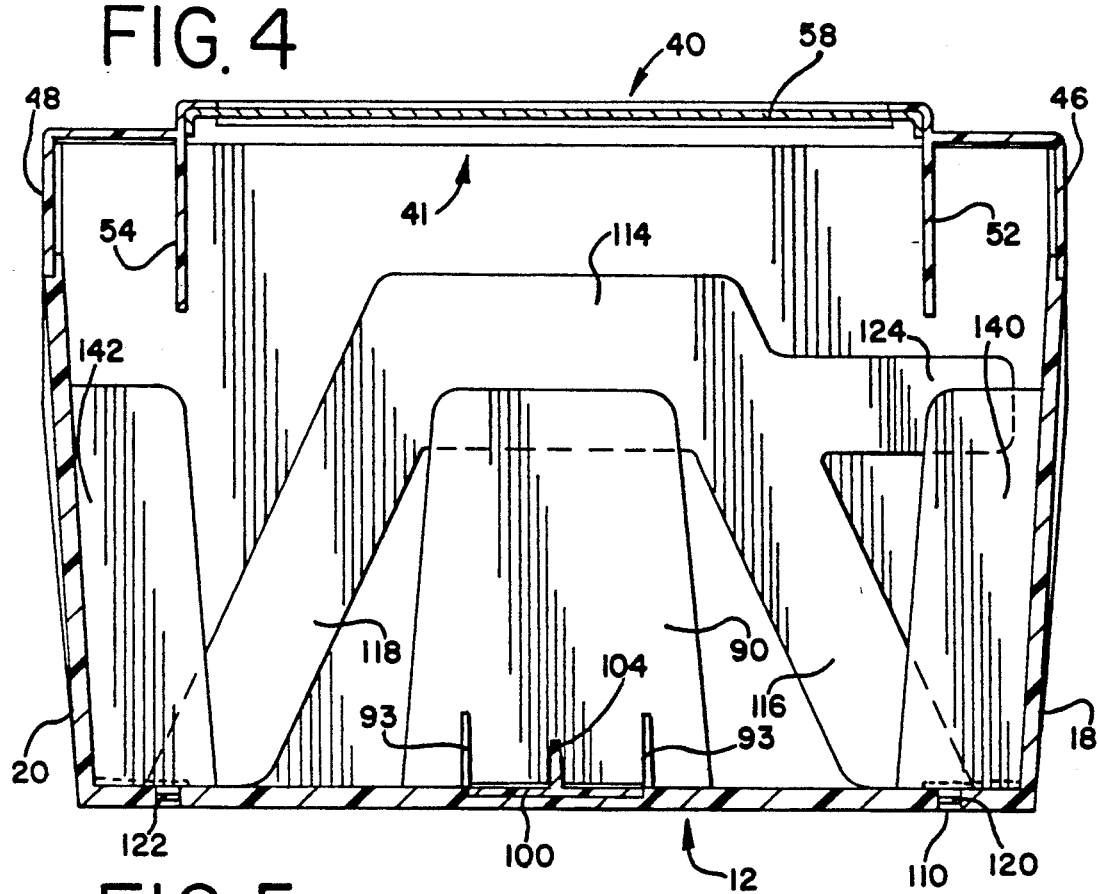
FIG. 4 is a cross-sectional view of several embodiments of the multi-media tray of the present invention taken along the front of the disk tray.

FIGS. 3 and 4 show another embodiment where a center structure 90 extends upward from the inside of the bottom 13 and is preferably located at the approximate center point of the bottom 12. Preferably, the center structure 90 is substantially flat with the flat side parallel to the plane of the front and rear wall, 14 and 16. In addition, the center structure 90 extends upward an amount sufficient to provide support for the disks placed in the inside of the bottom 13.

When a center structure 90 is present, the center insert 100 preferably has a length such that the center insert 100 will fit in the space defined by the center structure 90 and the bottom front wall 14. In addition, another center insert 100 may be placed in the space defined by the center structure 90 and the bottom rear wall 16. Conveniently, where a center structure 90 is provided, the securing means 93 and 97 are adjacent the center structure 90. Preferably, the securing means 93 and 97 are formed onto the center structure 90.

Of course, when a center structure 90 is provided, it acts as a permanent divider for disks placed into the tray 10. In this way the center structure 90 defines a suitable division between, for example, 3½ inch disks placed in the front of the tray 10 and floppy disks placed in the rear of the tray 10.

A first and second side structure 140 and 142, respectively, can also be provided to act as a permanent divider and further provide support for the side walls 18 and 20, respectively. The first side structure 140 extends upward from the inside of the bottom 13 and inward from the side wall 18, parallel to the front wall 14. The second side structure 142 extends upward from the inside portion of the bottom 13 and inward from the side wall 20 parallel to the front wall 14. The first and second side structures 140, 142 are preferably flat and are located in the same transverse vertical plane as the center structure 90. Preferably, side structures 140 and 142 extend upward an amount substantially equal to the center structure 90.

In another embodiment, a first plurality of slots 110 are provided in the first plurality of grooves 62 and a second plurality of slots 112 are provided in the second plurality of grooves 68. The second plurality of slots 112 correspond in location with the first plurality of slots 110. Of course, any number of slots 110 and 112 can be provided.

Figure 5:
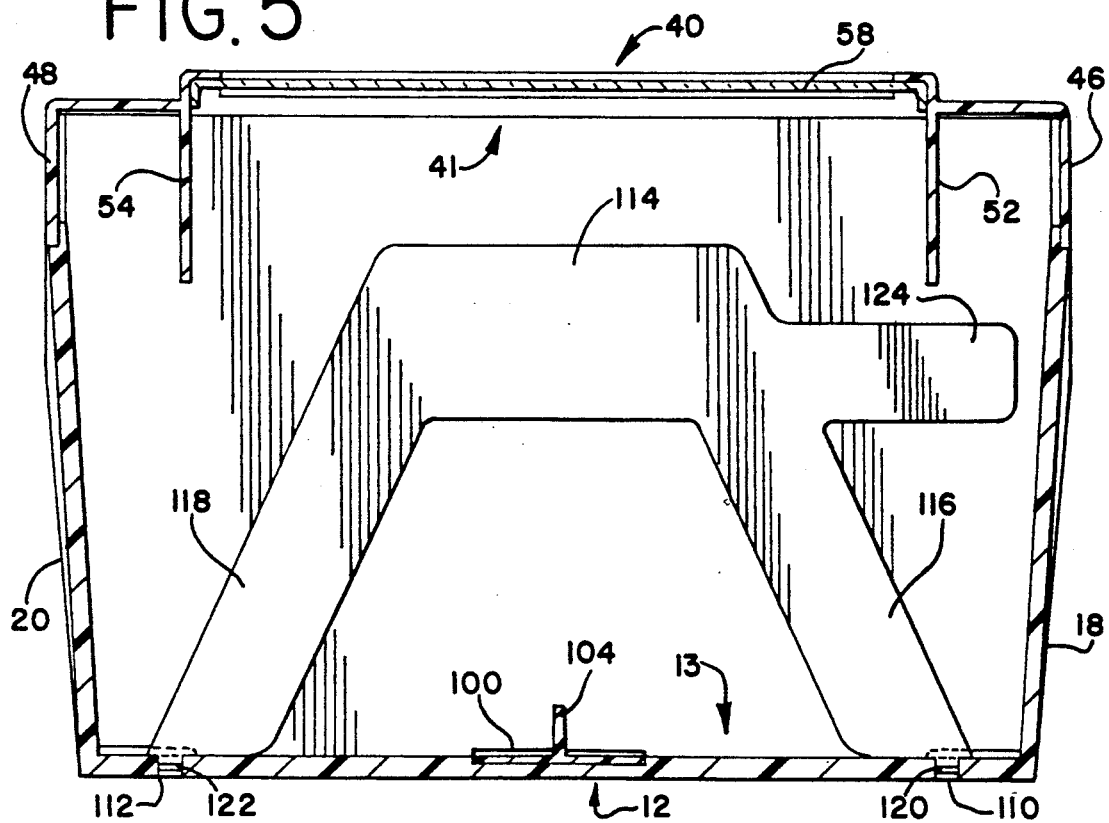
FIG. 5 is a cross-sectional view of several embodiments of the multi-media tray of the present invention taken along the front of the disk tray.

In this embodiment, there are provided a plurality of dividers 114 each having a first leg 116 and a second leg 118 extending downward as shown in FIGS. 3-5. The first leg 116 fits into a first slot 110 and the second leg 118 fits into a corresponding second slot 112. Preferably, the first leg 116 and the second leg 118 each have a protruding rib 120 and 122, respectively, to cooperatively engage the first slot 110 and the second slot 112, respectively, thereby removably securing each divider 114.

The dividers 114, when located in slots 110 and 112, have a height somewhat less than the height of a floppy disk that has been placed in the inside of the bottom 13. At the same time, the dividers 114 are shaped such that the legs 116 and 118 can support 3½ inch disks. Of course, any number of dividers 114 may be inserted into the slots 110 and 112 as desired by the user. Accordingly, the dividers 114 may be used to separate any type of media, whether they are the same or different. For example, they can separate 3½ inch disks from each other, 3½ inch disks from floppy disks, or floppy disks from each other.

In addition, dividers 114 can be provided with tabs 124 that extend from either leg 116 or 118 toward the side wall 18 or 20, respectively. The tab 124 can have a label placed on it so that when, for example, floppy disks are placed into the tray, the label may be read by the user.

FIGS. 4 and 5 show another embodiment where the top 40 has a first extension 52 and a second extension 54. The first extension 52 is spaced apart from and substantially parallel to a top side wall, for example, top side wall 46, and extends downward from the inside of the top 41. Preferably, the first extension 52 is spaced from the first top side wall 46 a distance such that the extension 52 is substantially aligned with the distal end of the first plurality of ridges 64. The second extension 54 is spaced apart from and substantially parallel to the second top side wall 48, and extends downward from the inside of the top 41. Preferably, the second extension 54 is spaced from the side wall 48 a distance such that the extension 54 is substantially aligned with the distal end of the second plurality of ridges 70.

Preferably, the first and second extension 52, 54 extend downward sufficiently so that the extensions 52, 54 substantially secure, from lateral movement, floppy disks placed in the inside of the bottom 13. As seen in FIGS. 4 and 5, the extensions 52 and 54 preferably extend downward below the height of the dividers 114. In addition, the extensions extend downward a sufficient amount such that there will be a small gap between the end of the extensions 52, 54 and the top of 3½ inch disks placed, for example, in the grooves 62 and 108.

In another embodiment, the bottom front wall 14 has a lip 22 that extends outwardly from the top or uppermost part of the bottom front wall 14 as shown in FIG. 2. An interlocking means 24 is provided on the lip 22 at any suitable location to be engaged by a means for locking 56, best seen in FIG. 10, which is located on the top 40 such that the tray 10 can be maintained in a closed condition. Of course, any means for locking with or without a key can be used.

For example, a void 55, shown in FIG. 1, can be provided in the top 40 during the molding process so that a locking means 56 can be snapped into place. Such a locking means can be a metal lock, a molded plastic lock or the like.

FIGS. 6-10, show the preferred embodiment of the multi-media tray of the present invention. The bottom 12 has a front edge 26 opposite a rear edge 28, a first side edge 30 opposite a second side edge 32, each edge extending outward and upward from the bottom 12 at an angle less than 90 degrees. Preferably, each edge extends outward and upward at an angle of about 45 degrees. In this embodiment the bottom front wall 14, rear wall 16, first side wall 18, and second side wall 20 extend upward substantially vertically from the respective edges 26, 28, 30, and 32, such that the front wall 14 is opposite to the rear wall 16 and substantially perpendicular to the first side wall 18 and the second side wall 20.

Figure 8:
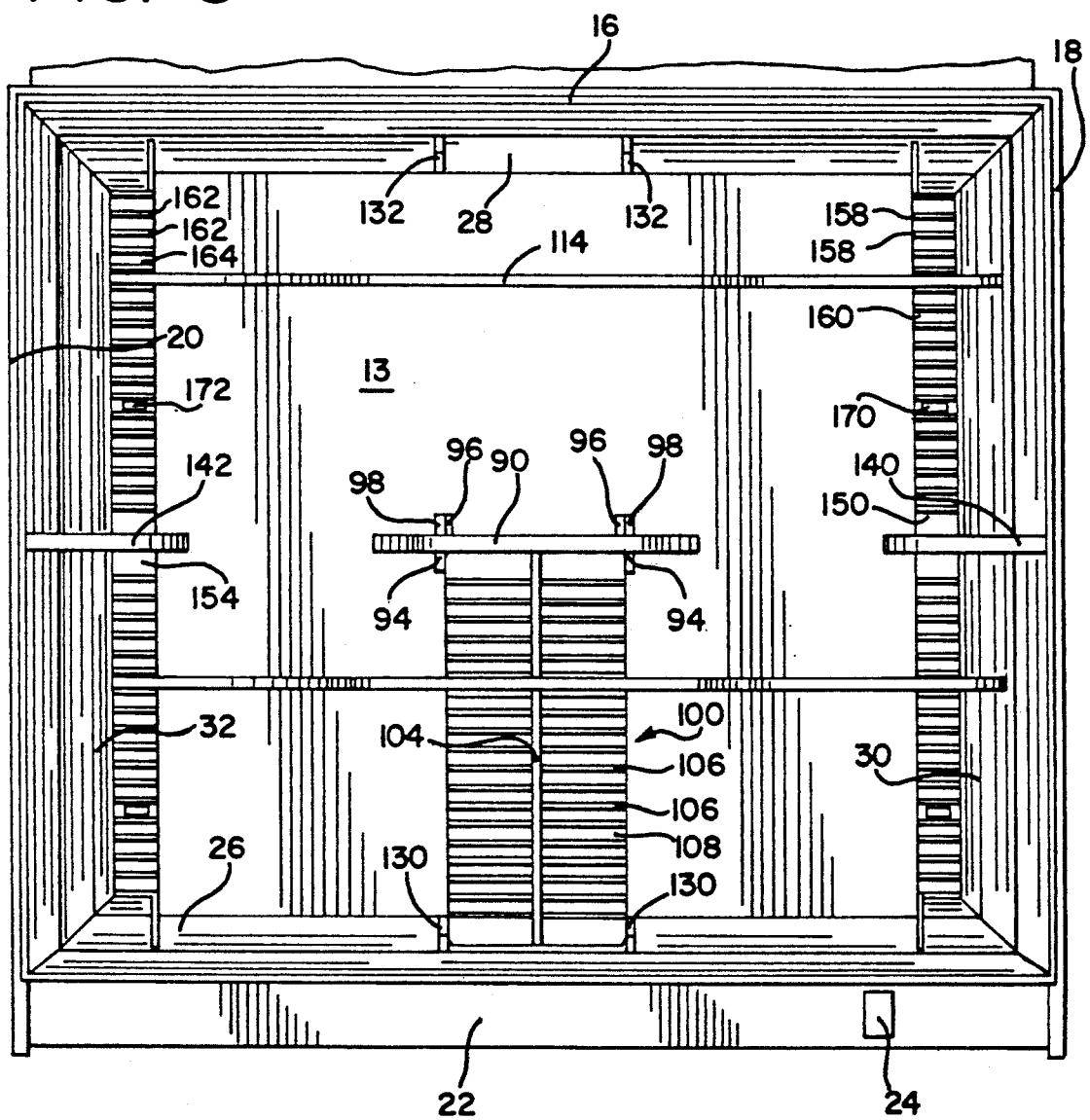
FIG. 8 is a top view of several embodiments of the multi-media tray of the present invention.
Figure 9:
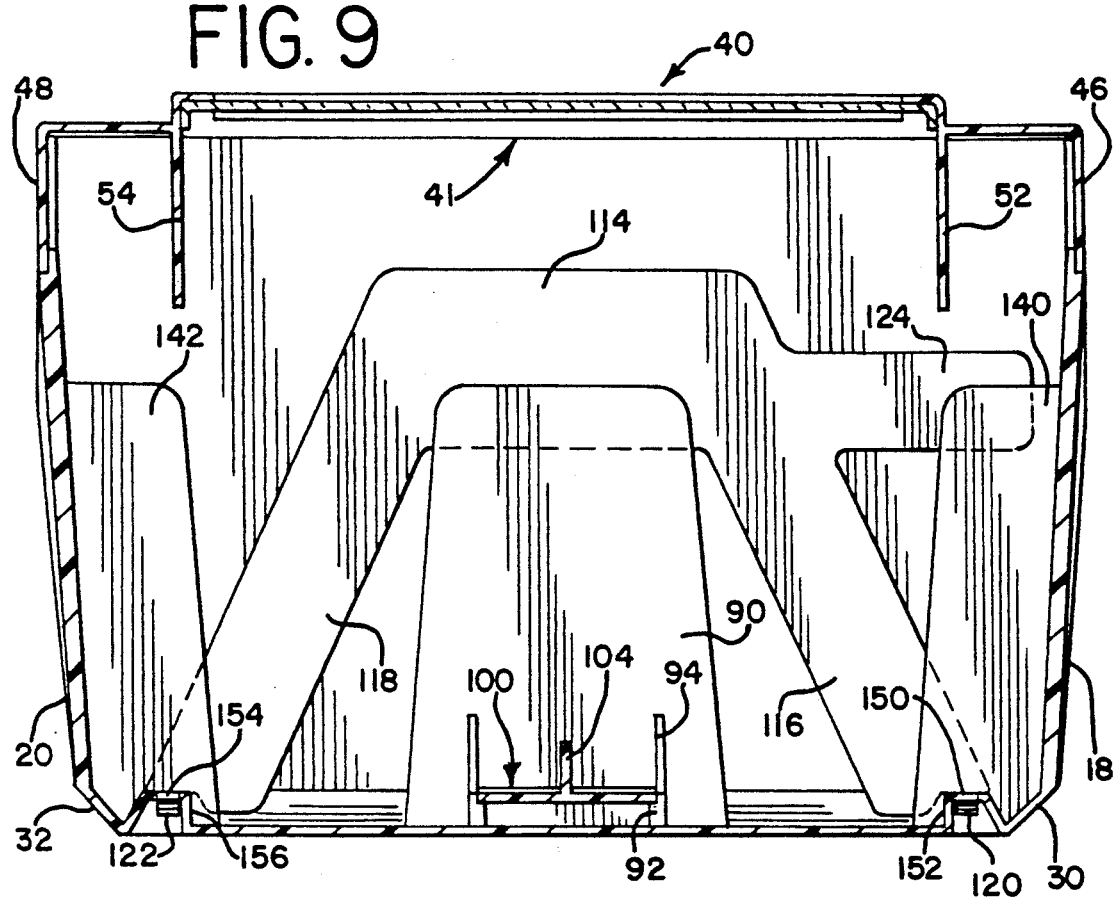
FIG. 9 is a cross-sectional view of several embodiments of the multi-media tray of the present invention taken along the front of the tray.

As shown in FIGS. 8 and 9, a first ledge 150 extends upward from the inside of the bottom 13 along the first side edge 30 from the front edge 26 to the rear edge 28. The ledge 150 has a first plurality of spaced apart ridges 158 that define a first plurality of grooves 160. A second ledge 154, parallel to the first ledge 150, extends upward from the inside of the bottom 13 along the second side edge 32 from the front edge 26 to the rear edge 28. The second ledge 154 has a second plurality of spaced apart ridges 162 that define a second plurality of grooves 164 which correspond in location with the first plurality of grooves 160. The ledges 150 and 154 can be any suitable height according to manufacturing preferences.

Preferably, ledges 150 and 154 extend from the edges 30 and 32 towards the center of the tray 10 an amount to substantially position floppy disks placed in the inside of the bottom 13. Preferably, the distal end of the first ledge 152 and the distal end of the second ledge 156 are each substantially equally located from their respective edges 30 and 32 and are spaced apart an amount substantially equal to the width of a CD container. Accordingly, floppy disks placed into the tray 10 will be positioned and substantially held from lateral movement by ledges 150 and 154.

In addition, as shown in FIG. 7, a top 40 is provided with a front wall 42 opposite a rear wall 44 (not seen), a first side wall 46 (not seen) and a second side wall 48 opposite side wall 46. As described above the top 40 is hinged to the bottom 12 by hinge 50, shown in FIG. 10.

The top 40 has a first extension 52 and a second extension 54 shown in FIG. 6. The first extension 52 is spaced apart from and substantially parallel to a top side wall, for example, top side wall 46, and extends downward from the inside of the top 41. Preferably, the first extension 52 is spaced from the first top side wall 46 a distance such that the extension 52 is substantially aligned with the distal end of the first plurality of ridges 152. The second extension 54 is spaced apart from and substantially parallel to the second top side wall 48, and extends downward from the inside of the top 41. Preferably, the second extension 54 is spaced from the side wall 48 a distance such that the extension 54 is substantially aligned with the distal end of the second plurality of ridges 156.

Figure 10:
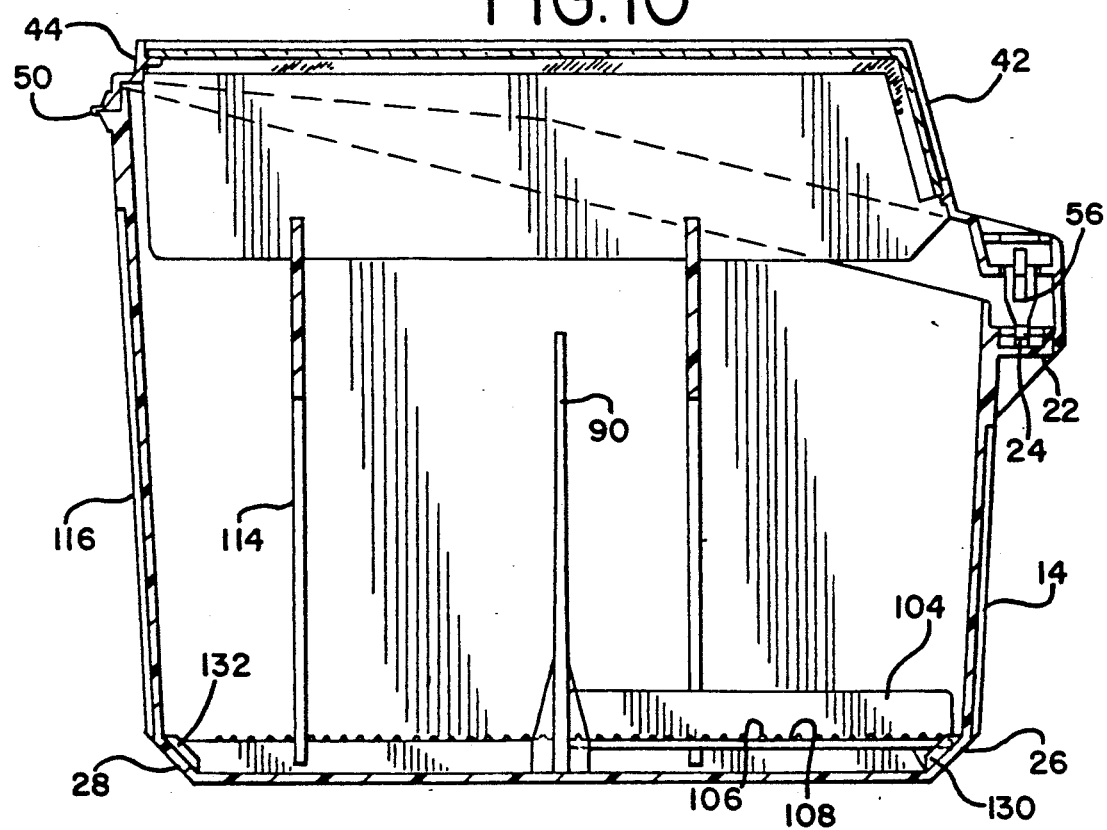
FIG. 10 is a cross-sectional view of several embodiments of the multi-media tray of the present invention taken along line 10—10 of FIG. 7.

Preferably, the first and second extension 52, 54 extend downward sufficiently so that the extensions 52, 54 substantially secure, from lateral movement, floppy disks placed in the inside of the bottom 13. As seen in FIGS. 9 and 10, the extensions 52 and 54 extend downward below the height of the dividers 114. In addition, the extensions extend downward a sufficient amount such that there will be a small gap between the end of the extensions 52, 54 and the top of 3½ inch disks that are placed, for example, in the grooves 108 and 160.

A center insert 100 identical to that as described above is provided.

In addition, a center structure 90, as described above, may also be provided. Where a center structure 90 is provided, it preferably has a first means for positioning 92 located on the side of the center structure 90 facing the bottom front wall 14 as shown in FIG. 8. The means 92 may be a pair of pegs, footings, protrusions, pins, posts, studs, bases, or the like, or it may be a single such peg, etc. for positioning the center insert 100. Preferably, the means for positioning 92 is molded integrally with the center structure 90 so that it extends upward from the inside of the bottom 13 and outward from the center structure 90 in the direction toward the front wall 14.

When a positioning means 92 is provided, one end of the center insert 100 is placed on the positioning means 92 while the other end rests on the front edge 26. Preferably, as shown in FIG. 9, the positioning means 92 extend upward to a height such that when the center insert 100 is placed into the tray 10 with one end of the center insert 100 resting on positioning means 92 and the other end resting on the front edge 26, the insert grooves 108 correspond in height and location with the first and second plurality of grooves 160 and 164.

Optionally, the first means for positioning 92 has a first means for securing 94. The means 94 may be a shoulder, ledge, lip, rim, or the like, located on the side of the first positioning means 92 facing side walls 18 and 20. Preferably, the securing means 94 extend upward to a height such that when the center insert 100 is placed onto the first positioning means 92, the center insert 100 will be secured from lateral movement. More preferably, the positioning means 92 and the securing means 94 are molded integral with the center structure 90. However, it is to be understood that a center structure 90 need not be provided, in which case the positioning means 92 and securing means 94 will be formed on the inside of the bottom 13 and extend upward.

Preferably, front spaced apart nubs 130 are provided. The nubs 130 extend inwardly from the front edge 26 and are aligned with the first securing means 94 to secure the center insert 100 from lateral movement.

The center structure 90 preferably is provided with a second means for positioning 96 located on the side of the center structure 90 facing the bottom rear wall 16. The second positioning means 96 may be the same or different as the first positioning means 92 for positioning another center insert 100. Preferably, the means for positioning 96 is molded integrally with the center structure 90 so that it extends upward from the inside portion of the bottom 13 and outward from the center structure 90 in the direction toward the rear wall 16.

When a second positioning means 96 is provided, one end of a center insert 100 is placed on the positioning means 96 while the other end rests on the rear edge 28.

Preferably, the positioning means 96 extend upward to a height such that when a center insert 100 is placed into the tray 10 with one end of the center insert 100 resting on positioning means 96 and the other end resting on the rear edge 28, the insert grooves 108 correspond in height and location with the first and second plurality of grooves 160 and 164.

Optionally, the second means for positioning 96 has a second means for securing 98. The means 98 may be the same as the first securing means 94 and are located on the side of the positioning means 96 facing side walls 18 and 20. The securing means 98 extend upward to a height such that when the center insert 100 is placed onto the second positioning means 96, the center insert 100 will be secured from lateral movement.

Preferably, rear spaced apart nubs 132 are provided. The nubs 132 extend inwardly from the bottom rear edge 28 and are aligned with the second securing means 98 to secure a center insert 100 from lateral movement.

Of course where a center structure 90 is not provided, the first and second means for positioning 92 and 96, and the first and second means for securing 94 and 93, if present, will be located in the same position as described above but will not extend from the center structure 90. If the user does not wish to store 3½ inch disks, the center inserts 100 may be removed. In this case, floppy disks may be placed into the tray 10 in the space defined by the ledges 150 and 154.

Alternatively, the user may store, in any combination, 3½ inch disks, floppy disks, CD containers as well as other media at the same time. For example, a center insert may be placed in the front of the tray 10 in the space defined by the center structure 90 and the front wall 14. Accordingly, 3½ inch disks can be stored in the front of the tray 10 while floppy disks can be stored in the rear of the tray 10.

In the preferred embodiment, a first plurality of slots 170 are provided in the first plurality of grooves 160 and a second plurality of slots 172 are provided in the second plurality of grooves 164. The second plurality of slots 172 correspond in location with the first plurality of slots 170. Of course, any number of slots 110 and 112 can be provided.

In this embodiment, there are provided a plurality of dividers 114 identical to those described above. Accordingly, any number of dividers 114 can be positioned in any one or more of corresponding slots 170 and 172 as shown in FIGS. 6-8. In this way, 3½ inch disks, floppy disks, and CDs, or other media, may be organized by the user by using the desired number of dividers 114.

It is understood that other means of providing for ridges and grooves can be included. For example, removable side inserts that contain a plurality of spaced apart ridges to define a plurality of grooves can be provided. In such an embodiment, one side insert would be placed along the side wall 18 and the other side insert would be placed along the side wall 20. Thus, when a center insert 100 is placed in the tray 10, the center insert grooves 108 would correspond in height and location with the grooves located on each of the side inserts.

Of course, detents could be provided on the inside of the bottom 13 where each of the side inserts and the center insert would be located so that all of the respective grooves would correspond. Also, positioning means similar to those described above could be used to position the side inserts such that the center insert grooves correspond in height with the grooves in the side inserts.

Alternatively, a one-piece removable insert could be provided. Such an insert would have side ridges similar to ridges 60 and 66, and a partition member with ridges extending from the partition member similar to the partition member 104 and the center insert ridges 106. Thus, where the tray has a flat bottom, a one-piece insert could be placed on the inside of the bottom 13.

Of course it should be understood that a wide range of changes and modifications can be made to the embodiments described above. It is therefore intended that the foregoing description illustrates rather than limits this invention, and that it is the following claims, including all equivalents, which define this invention.

I claim:

1. A multi-media tray comprising:

a. a bottom having a front wall, a rear wall, a first side wall and a second side wall opposite the first side wall, each wall extending upward from the bottom, the front wall being opposite to the rear wall and perpendicular to the side walls;
   b. a first plurality of spaced apart transverse ridges extending upward from the inside of the bottom along the first side wall of the tray with adjoining ridges defining a first plurality of grooves;
   c. a second plurality of spaced apart transverse ridges extending upward form the inside of the bottom along the second side wall of the tray with adjoining ridges defining a second plurality of grooves which correspond to the first grooves; and,
   d. at least one removable center insert having a partition member that extends upward from and longitudinally along the approximate center line of a top surface of the insert, the insert further having a plurality of transverse spaced apart ridges extending upward from the top surface, with adjoining ridges defining a plurality of insert grooves such that when the insert is placed in the inside of the bottom at least a portion of the insert grooves correspond to the first and second grooves.

2. The multi-media tray of claim 1 wherein the bottom, each wall, and the first and second ridges are made of plastic and are integrally molded.

3. The multi-media tray of claim 1 further comprising a top having a front wall, a rear wall, and two opposite side walls, each wall extending downward from the top, the front wall being opposite to the rear wall and perpendicular to the side walls, the top rear wall being hinged to the bottom rear wall.

4. The multi-media tray of claim 3 wherein the bottom, each bottom wall, the first and second ridges, the top, and each top wall, are integrally molded, and wherein the hinge is a plastic living hinge.

5. The multi-media tray of claim 3 further comprising:

a. a lip extending outwardly from the top of the bottom front wall;
   b. a means for interlocking located on the lip; and,
   c. a means for locking located on the top near the top front wall such that the locking means cooperates with the interlocking means to secure the top in a closed position with the bottom.

6. The multi-media tray of claim 1 further having:

a. a first plurality of slots located in the first plurality of grooves;
   b. a second plurality of slots located in the second plurality grooves which correspond in location with the first slots; and,
   c. a plurality of dividers, each divider having a first leg and a second leg, the first leg fitting in a first slot and the second leg fitting in a corresponding second slot thereby removably securing each divider.

7. A multi-media tray comprising:

a. a bottom having a front wall, a rear wall, and two opposite side walls, each wall extending upward form the bottom, the front wall being opposite to the rear wall and perpendicular to the side walls;
   b. a first plurality of spaced apart ridges extending upward from the bottom along one side wall of the tray, the ridges defining a first plurality of grooves;
   c. a second plurality of spaced apart ridges parallel and opposed to the first plurality of ridges and extending upward form the bottom along the other side wall of the tray, the ridges defining a second plurality of grooves which correspond to the first grooves;

d. at least one substantially flat removable center insert having a partition member that extends upward from and longitudinally along the approximate center line of the insert, the insert further having a plurality of transverse spaced apart ridges that define a plurality of insert grooves such that when the insert is placed into the bottom the insert grooves correspond to the first and second grooves e. a top having a front wall, a rear wall, and two opposite side walls, each wall extending downward from the top, the front wall being opposite to the rear wall and perpendicular to the side walls, the top rear wall being hinged to the bottom rear wall;

f. a first extension spaced apart from and substantially parallel to one top side wall and extending downward from the top; and, g. a second extension spaced apart form and parallel to the other side wall and extending downward from the top, the first and second extensions extend downward an amount so as to substantially secure from lateral movement media, having the approximate size of a floppy disk, that can be placed into the tray.

8. The multi-media tray of claim 7 wherein the first and second extension extend upward from the top to create an opening-in the top in the space between the first and second extension.

9. The multi-media tray of claim 8 wherein the top further has a transparent plastic window located in the opening.

10. A multi-media tray comprising:
a. a bottom with four edges, a front edge opposite a rear edge, and a first side edge opposite a second side edge, each edge extending upward at an oblique angle;
b. a bottom front wall opposite a bottom rear wall, a first bottom side wall opposite to a second bottom side wall, each wall extending substantially vertically upward from the edges, the bottom front wall being opposite to the bottom rear wall and substantially perpendicular to the bottom side walls;
c. a first ledge extending upward for the inside of the bottom along the first side edge of the tray, the ledge having a plurality of transverse spaced apart ridges with adjoining ridges defining a first plurality of grooves on the ledge;
d. a second ledge extending upward from the inside of the bottom along the second side edge of the tray, the ledge having a plurality of transverse spaced apart ridges with adjoining ridges defining a second plurality of grooves on the ledge which correspond to the first grooves on the first ledge;
e. a means for positioning located on the inside of the bottom at the approximate center point of the bottom; and,
f. a removable center insert having a partition member extending upward from and longitudinally along the approximate center line of a top surface the insert, the insert also having a plurality of transverse spaced apart ridges extending upward form the top surface, with adjoining ridges defining grooves such that, when one end of the insert is placed onto the positioning means, at least a portion of the insert grooves correspond to and have substantially the same height as the first and second grooves on the first and the second ledge, respectively.

11. The multi-media tray of claim 10 further having a pair of spaced apart nubs extending from the front edge and aligned with the positioning means to position and secure the center insert from lateral movement.

12. The multi-media tray of claim 10 further having:
a. a top with a front wall, a rear wall, and two opposite side walls extending downward from the top, the front wall being opposite to the rear wall and substantially perpendicular to the side walls, the top rear wall being hinged to the bottom rear wall.

13. The multi-media tray of claim 12 further comprising:
a. a lip extending outwardly form the top edge of the bottom front wall;
b. a means for interlocking located on the lip; and,
c. a means for locking located on the top near the top front wall such that the locking means cooperates with the interlocking means to secure the top in a closed position with the bottom.

14. The multi-media tray of claim 10 where each positioning means further has a securing means to secure the insert from lateral movement.

15. The multi-media tray of claim 10 further having:
a. a first plurality of slots in the first plurality of grooves;
b. a second plurality of slots in the second plurality grooves which correspond in location with the first slots; and,
c. a plurality of dividers, the dividers having a first leg and a second leg, the first leg fitting in a first slot and the second leg fitting in a corresponding second slot thereby removably securing each divider.

16. A multi-media tray comprising:
a. a bottom with four edges, a front edge opposite a rear edge, and a first side edge opposite a second side edge, each edge extending upward at an angle less than about 90 degrees;
b. a bottom front wall opposite a bottom rear wall, a first bottom side wall opposite to a second bottom side wall, each wall extending substantially vertically upward from the edges, the bottom front wall being opposite to the bottom rear wall and substantially perpendicular to the bottom side walls;
c. a first ledge extending upward from the bottom along the first side edge of the tray, the ledge having a plurality of spaced apart ridges that define a first plurality of grooves on the ledge;
d. a second ledge, parallel and opposed to the first ledge, extending upward from the bottom along the second side edge of the tray, the ledge having a plurality of spaced apart ridges that define a second plurality of grooves on the ledge which correspond to the first grooves on the first ledge;
e. a means for positioning located on the inside of the bottom at the approximate center point of the bottom;
f. a substantially flat removable center insert having a partition member extending upward from and longitudinally along the approximate center line of the insert, the insert also having a plurality of transverse spaced apart ridges that define grooves such that, when one end of the insert is placed onto the positioning means, the insert grooves correspond to and have substantially the same height as the first and second grooves on the first and the second ledge, respectively;

g. a top with a front wall, a rear wall, and two opposite side walls extending downward from the top, the front wall being opposite to the rear wall and substantially perpendicular to the side walls, the top rear wall being hinged to the bottom rear wall;

h. a first extension spaced apart from and substantially parallel to one top side wall and extending downward form the top; and, i. a second extension spaced apart from and substantially parallel to the other top side wall and extending downward from the top.

17. The multi-media tray of claim 13 wherein the first and second extension extend upward form the top to create an opening in the top in the space between the first and second extension.

18. The multi-media tray of claim 17 wherein the top further has a transparent plastic window located in the opening.

19. An integrally molded plastic multi-media tray comprising:

a. a bottom with four edges, a front edge opposite a rear edge, and a first side edge opposite a second side edge, each edge extending upward at an oblique angle;

b. a bottom front wall opposite a bottom rear wall, a first bottom side wall opposite to a second bottom side wall, each wall extending substantially vertically upward from the edges, the bottom front wall being opposite to the bottom rear wall and substantially perpendicular to the bottom side walls;

c. a top with a front wall, a rear wall, and two opposite side walls extending downward from the top, the front wall being opposite to the rear wall and substantially perpendicular to the side walls, the top rear wall being hinged to the bottom rear wall;

d. a first extension spaced apart from and substantially parallel to one top side wall and extending downward from the top;

e. a second extension spaced apart from and substantially parallel to the other top side wall and extending downward from the top;

f. a first ledge extending upward form the inside of the bottom along the first side edge of the tray, the ledge having a plurality of transverse spaced apart ridges with adjoining ridges defining a first plurality of grooves on the ledge;

g. a second ledge extending upward form the inside of the bottom along the second side edge of the tray, the ledge having a plurality of transverse spaced apart ridges with adjoining ridges defining a second plurality of grooves on the ledge which correspond to the first grooves on the first ledge;

h. a means for positioning located on the inside of the bottom at the approximate center point of the bottom;

i. a substantially flat removable center insert having a partition member extending upward from said longitudinally along the approximate center line of the insert, the insert also having a plurality of transverse spaced apart ridges that define grooves such that, when one end of the insert is placed onto the positioning means, at least a portion of the insert grooves correspond to and have substantially the same height as the first and second grooves on the first and the second ledge, respectively;

j. a first plurality of slots in the first plurality of grooves;

k. a second plurality of slots in the second plurality grooves which correspond in location with the first slots; and, l. a plurality of dividers, the dividers having a first leg and a second leg, the first leg fitting in a first slot and the second leg fitting in a corresponding second slot thereby removably securing each divider.

20. A multi-media tray comprising:

a. a bottom with a front wall, a rear wall, a first side wall, and a second side wall opposite the first side wall, the front wall being opposite to the rear wall and perpendicular to the side wall;

b. a first ledge extending upward from the bottom near the first side wall of the tray and substantially the length of the first side wall;

c. a second ledge extending upward form the bottom near the second side wall of the tray and substantially the length of the second side wall;

d. an upwardly extending protrusion located on the inside of the bottom at the approximate center point of the bottom; and, e. a removable center insert having a partition member extending upward from and longitudinally along the approximate center line of a top surface of the insert, the partition member lying in a plane substantially parallel to the side walls, such that when one end of the insert is placed onto the protrusion, the top surface of the insert has substantially the same height as the height of the first and second ledge.

21. The multi-media tray of claim 20 wherein the first ledge has a plurality of transverse spaced apart ridges, the second ledge has a plurality of transverse spaced apart ridges which correspond to the plurality of ridges on the first ledge, and the insert has a plurality of transverse spaced apart ridges extending upward from the top surface such that when one end of the insert is placed onto the protrusion, at least a portion of the insert ridges correspond to and lie in the same plane as the ridges on the first and the second ledge.

22. The multi-media tray of claim 20 further having a top, having a front wall, a rear wall, and two opposite side walls extending downwardly from the top, the front wall being opposite to the rear wall and perpendicular to the side walls, the top rear wall being hinged to the bottom rear wall.

* * * * *

UNITED STATES PATENT AND TRADEMARK OFFICE
CERTIFICATE OF CORRECTION

PATENT NO. : 5,205,625
DATED : April 27, 1993
INVENTOR(S) : Richard C. Koch

Page 1 of 2

It is certified that error appears in the above-indentified patent and that said Letters Patent is hereby corrected as shown below:

Column 10, line 12, delete "form" and substitute --from--.

Column 10, line 61, delete "form" and substitute --from--.

Column 10, line 68, delete "form" and substitute --from--.

Column 11, line 20, delete "form" and substitute --from--.

Column 11, line 45, delete "for" and substitute --from--.

Column 11, line 63, delete "form" and substitute --from--.

Column 12, line 15, delete "form" and substitute --from--.

Column 13, line 10, delete "form" and substitute --from--.

Column 13, line 15, delete "form" and substitute --from--.

UNITED STATES PATENT AND TRADEMARK OFFICE
CERTIFICATE OF CORRECTION

PATENT NO. : 5,205,625
DATED : April 27, 1993
INVENTOR(S) : Richard C. Koch

It is certified that error appears in the above-indentified patent and that said Letters Patent is hereby corrected as shown below:

Column 13, line 45, delete "form" and substitute --from--.

Column 13, line 50, delete "form" and substitute --from--.

Column 14, line 21, delete "said" and substitute --and--.

Column 14, line 24, delete "wall" and substitute --walls--.

Column 14, line 28, delete "form" and substitute --from--.

Signed and Sealed this

Thirteenth Day of September, 1994

Attest:

BRUCE LEHMAN

*Attesting Officer*    *Commissioner of Patents and Trademarks*